(12) United States Patent
Tanaka

(10) Patent No.: US 11,827,832 B2
(45) Date of Patent: Nov. 28, 2023

(54) GREASE AND REFRIGERATION CYCLE APPARATUS USING GREASE AS LUBRICANT

(71) Applicant: DAIKIN INDUSTRIES, LTD., Osaka (JP)

(72) Inventor: Masaru Tanaka, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/951,340

(22) Filed: Sep. 23, 2022

(65) Prior Publication Data

US 2023/0014676 A1    Jan. 19, 2023

Related U.S. Application Data

(63) Continuation of application No. PCT/JP2021/011748, filed on Mar. 22, 2021.

(30) Foreign Application Priority Data

Mar. 26, 2020 (JP) ................ 2020-056350

(51) Int. Cl.
| | |
|---|---|
| *C09K 5/04* | (2006.01) |
| *C10M 107/38* | (2006.01) |
| *C10M 119/22* | (2006.01) |
| *C10M 171/00* | (2006.01) |
| *F25B 1/053* | (2006.01) |

(52) U.S. Cl.
CPC ............ *C09K 5/044* (2013.01); *C10M 107/38* (2013.01); *C10M 119/22* (2013.01); *C10M 171/008* (2013.01); *F25B 1/053* (2013.01); *C09K 2205/126* (2013.01); *C09K 2205/42* (2013.01); *C10M 2213/003* (2013.01); *C10M 2213/006* (2013.01); *F25B 2500/16* (2013.01)

(58) Field of Classification Search
CPC .............. C09K 5/044; C09K 2205/126; C09K 2205/42; C10M 107/38; C10M 119/22; C10M 171/008; C10M 2213/003; C10M 2213/006; C10M 2213/0626; F25B 1/053; F25B 2500/16; F25B 2339/047; F25B 2700/1933; F25B 49/02; F25B 2600/2513; F25B 2700/21175; C10N 2020/099; C10N 2040/02; C10N 2040/30; C10N 2050/10
USPC ............ 252/67, 68, 69; 62/467, 529
See application file for complete search history.

(56) References Cited

U.S. PATENT DOCUMENTS

| | | |
|---|---|---|
| 2007/0213240 A1 | 9/2007 | Shimura et al. |
| 2009/0272134 A1 | 11/2009 | Hulse et al. |
| 2011/0152140 A1 | 6/2011 | Iwata et al. |
| 2014/0165631 A1 | 6/2014 | Santrock et al. |
| 2017/0097007 A1 | 4/2017 | Sishtla |
| 2017/0166831 A1 | 6/2017 | Matsumoto |

FOREIGN PATENT DOCUMENTS

| | | | |
|---|---|---|---|
| CN | 107760409 A | 3/2018 | |
| JP | 5-5491 A | 1/1993 | |
| JP | 2006-8818 A | 1/2006 | |
| JP | 2011-520089 A | 7/2011 | |
| KR | 10-2019-0115130 A | 10/2019 | |
| WO | WO-2006064869 A1 * | 6/2006 | .......... C10M 169/02 |
| WO | WO-2018180337 A1 * | 10/2018 | ............. F25B 1/053 |
| WO | WO-2019123924 A1 * | 6/2019 | ............. F04B 49/06 |
| WO | WO 2020/129305 A1 | 6/2020 | |

OTHER PUBLICATIONS

English translation of WO2019/123924A1, Jun. 27, 2019. (Year: 2019).*
English translation of WO2018/180337A1, Oct. 4, 2018. (Year: 2018).*
English translation of WO2006/064869A1, Jun. 22, 2006. (Year: 2006).*
International Search Report, issued in PCT/JP2021/011748, PCT/ISA/210, dated Jun. 22, 2021.
Written Opinion of the International Searching Authority, issued in PCT/JP2021/011748, PCT/ISA/237, dated Jun. 22, 2021.
English Translation of International Preliminary Report on Patentability and Written Opinion of the International Searching Authority for International Application No. PCT/JP2021/011748, dated Oct. 6, 2022.
Extended European Search Report dated Jul. 7, 2023 for Application No. 21774538.9.

* cited by examiner

*Primary Examiner* — Douglas J McGinty
(74) *Attorney, Agent, or Firm* — Birch, Stewart, Kolasch & Birch, LLP

(57) ABSTRACT

Provided is grease capable of suppressing a decrease in a function as a lubricant even when used in a device installed in a refrigerant circuit in which a refrigerant containing a chlorine atom and an olefin bond in a molecule flows, and a refrigeration cycle apparatus using the grease as a lubricant. Grease that is used in a device installed in a refrigerant circuit in which a refrigerant containing a chlorine atom and an olefin bond in a molecule flows contains fluorine as a component. In a chiller apparatus, the grease is used as a lubricant for at least one of a first radial touchdown bearing and a second radial touchdown bearing of a compressor, a drive portion of an inlet guide vane of the compressor, and a drive portion of an expansion valve.

2 Claims, 2 Drawing Sheets

GREASE AND REFRIGERATION CYCLE APPARATUS USING GREASE AS LUBRICANT

CROSS REFERENCE TO RELATED APPLICATIONS

This application is a Continuation of PCT International Application No. PCT/JP2021/011748, filed on Mar. 22, 2021, which claims priority under 35 U.S.C. 119(a) to Patent Application No. 2020-056350, filed in Japan on Mar. 26, 2020, all of which are hereby expressly incorporated by reference into the present application.

TECHNICAL FIELD

The present disclosure relates to grease that is to be used in a device installed in a refrigerant circuit in which a refrigerant including a chlorine atom and an olefin bond in a molecule flows, and a refrigeration cycle apparatus that uses the grease as a lubricant.

BACKGROUND ART

As shown in PTL 1 (Japanese Unexamined Patent Application Publication (Translation of PCT Application) No. 2011-520089), a refrigerant that has a small global warming potential and that includes a chlorine atom and an olefin bond in a molecule may be used for environmental conservation in a refrigeration cycle apparatus.

SUMMARY

Grease according to an embodiment is grease that is used in a device installed in a refrigerant circuit in which a refrigerant containing a chlorine atom and an olefin bond in a molecule flows. The grease contains fluorine as a component.

A refrigeration cycle apparatus according to an embodiment includes a refrigerant circuit in which a refrigerant that contains a chlorine atom and an olefin bond in a molecule flows. At least a turbo compressor and an expansion valve are installed in the refrigerant circuit. The turbo compressor includes an inlet guide vane, a motor, a shaft, an impeller, and a rolling bearing. The inlet guide vane is provided at a suction port of the turbo compressor. The shaft is coupled to the motor. The impeller is provided on the shaft. The rolling bearing pivotably supports the shaft. The expansion valve includes a valve body and a drive portion of the valve body. Grease containing fluorine is used as a lubricant for at least one of the rolling bearing of the turbo compressor, a drive portion of the inlet guide vane of the turbo compressor, and the drive portion of the expansion valve.

DESCRIPTION OF EMBODIMENTS

Hereinafter, an embodiment of grease and a refrigeration cycle apparatus will be described with reference to the drawings.

(1) Overview of Chiller Apparatus

Figure 1:
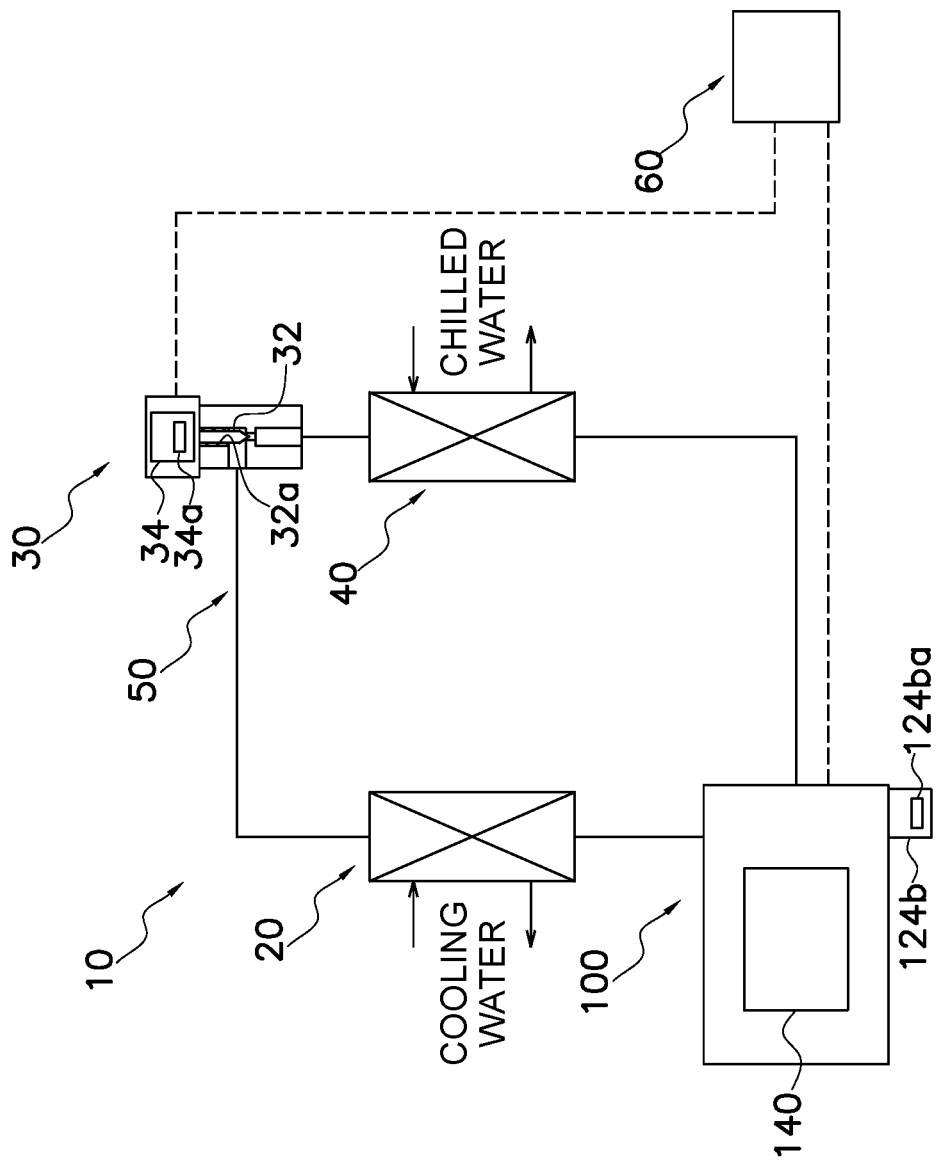
FIG. 1 is a schematic diagram of a chiller apparatus according to an embodiment of a refrigeration cycle apparatus.

A chiller apparatus 10 in which grease according to the present disclosure is used as a lubricant will be described with reference to FIG. 1. FIG. 1 is a schematic diagram of the chiller apparatus 10.

The chiller apparatus 10 is an example of a refrigeration cycle apparatus that uses a vapor compression refrigeration cycle. The chiller apparatus 10 is an apparatus that cools liquid (heat medium) by causing the liquid to exchange heat with a refrigerant. The liquid cooled in the chiller apparatus 10 is supplied to a use-side device (not illustrated) and used for air conditioning, cooling of facility devices, and the like. The liquid used in the present embodiment is, for example, water or brine. The brine is, for example, a sodium chloride aqueous solution, a calcium chloride aqueous solution, an ethylene glycol aqueous solution, a propylene glycol aqueous solution, or the like. The liquid (heat medium) that exchanges heat with the refrigerant is not limited to the types presented here as examples and may be selected, as appropriate. In the present embodiment, water is used as the liquid (heat medium).

The type of the refrigeration cycle apparatus is not limited to the chiller apparatus that cools liquid. For example, the refrigeration cycle apparatus may be an apparatus that causes the liquid (heat medium) to exchange heat with the refrigerant, thereby heating the liquid. The refrigeration cycle apparatus may be an apparatus that causes air, instead of a liquid, to exchange heat with the refrigerant, thereby cooling or heating the air.

The chiller apparatus 10 includes a refrigerant circuit 50. Devices disposed in the refrigerant circuit 50 include, mainly, a compressor 100, a condenser 20, an expansion valve 30, and an evaporator 40. The refrigerant circuit 50 is configured such that the compressor 100, the condenser 20, the expansion valve 30, and the evaporator 40 are connected to each other by refrigerant pipes as follows. A discharge pipe 116, which will be described later, of the compressor 100 is connected to an inlet of the condenser 20 by a refrigerant pipe. An outlet of the condenser 20 is connected to an inlet of the evaporator 40 by a refrigerant pipe. The expansion valve 30 is disposed in the refrigerant pipe that connects the outlet of the condenser 20 and the inlet of the evaporator 40 to each other. An outlet of the evaporator 40 is connected to a later-described suction pipe 114 of the compressor 100.

Devices disposed in the refrigerant circuit 50 are not limited to the compressor 100, the condenser 20, the expansion valve 30, and the evaporator 40 and may include, in addition to these devices, other devices that are generally used in the refrigerant circuit 50 of the refrigeration cycle apparatus.

The refrigerant circuit 50 is charged with a refrigerant that contains a chlorine atom and an olefin bond in a molecule. The refrigerant that contains a chlorine atom and an olefin bond in a molecule and that is charged in the refrigerant circuit 50 includes, for example, R1233zd(E) (trans-1-chloro-3,3,3-trifluoropropene), R1233xf (2-chloro-3,3,3-trifluoropropene), and R1224yd(Z) ((Z)-1-chloro-2,3,3,3-tetrafluoropropene); however, the type of the refrigerant is not limited. The refrigerant charged in the refrigerant circuit 50 may be a refrigerant of a single component or may be a mixed refrigerant in which two or more types of refrigerants are mixed. In the chiller apparatus 10 of the present embodiment, a single component of R1233zd(E) is used as a refrigerant.

The chiller apparatus 10 also includes a controller 60 that controls operation of various components (an inlet guide vane 124, a motor 140, and a magnetic bearing 150, which will be described later) of the compressor 100, the expansion valve 30, and portions of the chiller apparatus 10.

When the chiller apparatus 10 is operated, the refrigerant circulates in the refrigerant circuit 50, and a refrigeration cycle is performed. Specifically, when the motor 140 of the compressor 100 is operated, the compressor 100 sucks a low-pressure gas refrigerant of the refrigeration cycle, compresses the sucked gas refrigerant, and discharges the gas refrigerant as a high-pressure gas refrigerant of the refrigeration cycle. The high-pressure gas refrigerant discharged by the compressor 100 is sent to the condenser 20. The high-pressure gas refrigerant sent to the condenser 20 radiates heat and condenses in the condenser 20, thereby becoming a high-pressure liquid refrigerant. The refrigerant that has condensed in the condenser 20 passes through the expansion valve 30 and is sent to the evaporator 40. The high-pressure liquid refrigerant that flows from the condenser 20 toward the evaporator 40 is decompressed when passing through the expansion valve 30 and becomes a low-pressure gas-liquid two-phase refrigerant. The low-pressure gas-liquid two-phase refrigerant that has flowed into the evaporator 40 evaporates by absorbing heat from the liquid (heat medium) that is supplied to the evaporator 40, thereby becoming a low-pressure gas refrigerant. As a result of the refrigerant absorbing heat from the liquid in the evaporator 40, the liquid is cooled. The liquid cooled in the evaporator 40 is supplied to a use-side device (not illustrated) that uses the cooled liquid. The gas refrigerant that has evaporated in the evaporator 40 is sucked by the compressor 100 and compressed again.

(2) Detailed Configuration of Chiller Apparatus (2-1) Compressor

The compressor 100 is an apparatus that sucks a low-pressure gas refrigerant of the refrigeration cycle, compresses the sucked gas refrigerant, and discharges the gas refrigerant as a high-pressure gas refrigerant of the refrigeration cycle. In the present embodiment, the compressor 100 is a single-stage compression turbo compressor.

The compressor 100 is, however, not limited to the single-stage compression turbo compressor and may be a multi-stage compression turbo compressor. The type of the compressor used in the refrigeration cycle apparatus is not limited to the turbo compressor and may be a compressor of another type. For example, the compressor of the refrigeration cycle apparatus may be a positive-displacement compressor, such as a screw compressor, instead of a centrifugal compressor, such as a turbo compressor.

The compressor 100 of the present embodiment is an oil-free compressor that does not use a refrigerating-machine oil (lubricating oil) for lubrication of sliding portions.

Figure 2:
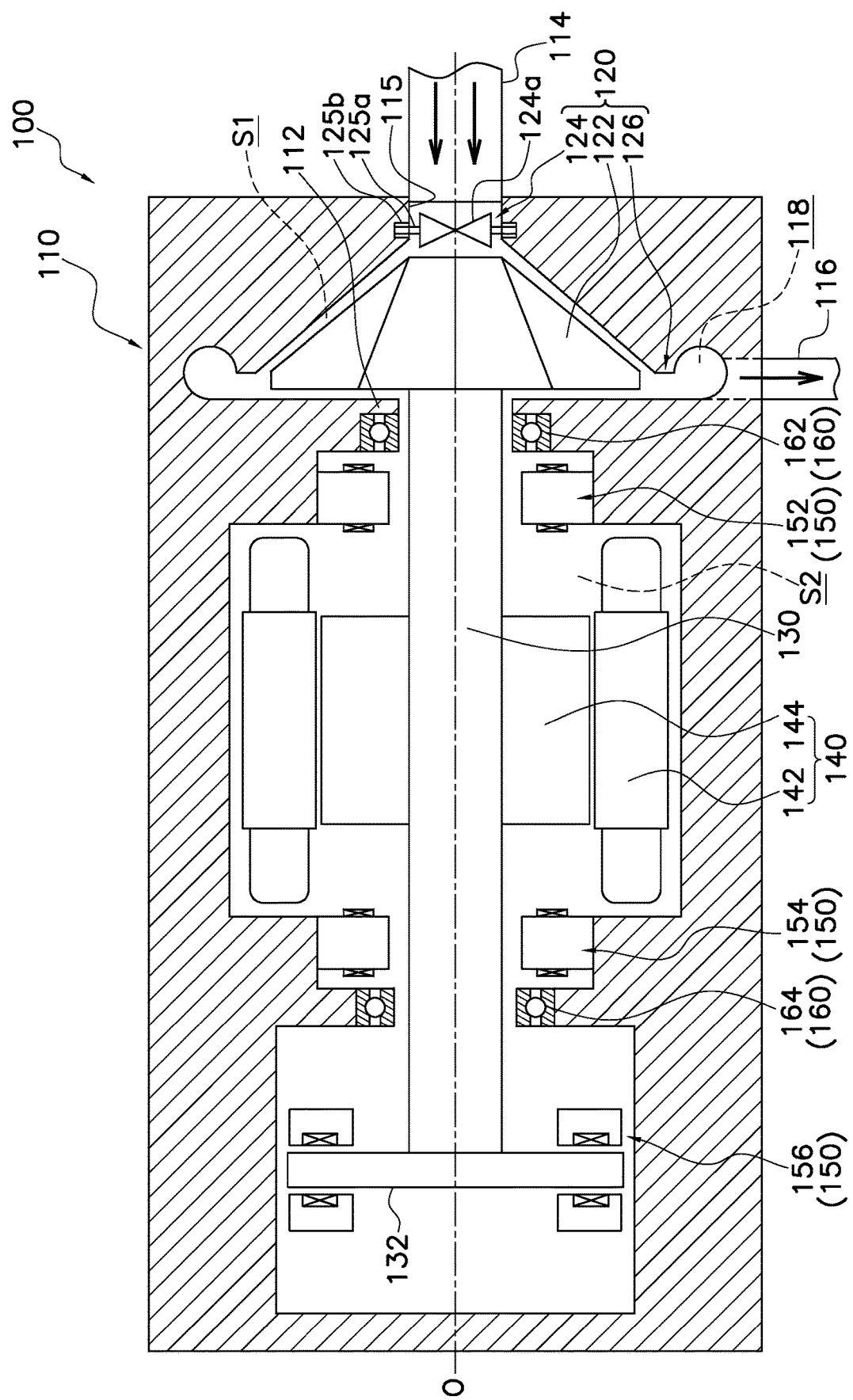
FIG. 2 is a schematic sectional view of a compressor used in the chiller apparatus in FIG. 1.

The structure of the compressor 100 will be described with reference to FIG. 2. FIG. 2 is a schematic sectional view of the compressor 100. The compressor 100 includes, mainly, a casing 110, a compression mechanism 120, a shaft 130, a motor 140, a magnetic bearing 150, and a touchdown bearing (auxiliary bearing) 160.

Configurations of these components of the compressor 100 will be roughly described.

The casing 110 accommodates therein various components of the compressor 100, including the compression mechanism 120, the shaft 130, the motor 140, the magnetic bearing 150, and the touchdown bearing 160.

The compression mechanism 120 includes, mainly, an impeller 122, the inlet guide vane 124, and a diffuser portion 126 provided in the casing 110. After increasing the speed of a refrigerant gas by the rotation of the impeller 122, the compression mechanism 120 converts the kinetic energy of the refrigerant gas into a pressure at the diffuser portion 126 and thereby compresses the refrigerant gas.

The impeller 122 of the compression mechanism 120 is attached to the shaft 130. The shaft 130 is coupled to a later-described rotor 144 of the motor 140. When the rotor 144 of the motor 140 rotates, the shaft 130 rotates, and the impeller 122 attached to the shaft 130 rotates.

The magnetic bearing 150 magnetically floats the shaft 130 and rotatably supports the shaft 130. The touchdown bearing 160 supports the shaft 130 while the magnetic bearing 150 is not energization due to a power failure or the like, in other words, while the shaft 130 is not magnetically floated.

Details of the casing 110, the compression mechanism 120, the shaft 130, the motor 140, the magnetic bearing 150, and the touchdown bearing 160 will be described.

(2-1-1) Casing

The casing 110 has a cylindrical shape closed at both ends. The compressor 100 is installed in an orientation in which a center axis O of the cylindrical casing 110 extends substantially horizontally. The internal space of the casing 110 is demarcated by a wall portion 112 into an impeller chamber S1 that accommodates the impeller 122 of the compression mechanism 120 and a motor chamber S2 that accommodates the motor 140. In FIG. 2, the impeller chamber S1 is disposed on the right side of the wall portion 112, and the motor chamber S2 is disposed on the left side of the wall portion 112. The impeller chamber S1 and the motor chamber S2 are demarcated by the wall portion 112 to be in communication with each other, not in an airtight manner.

The casing 110 is provided with the suction pipe 114 and the discharge pipe 116.

One end of the suction pipe 114 is connected to a suction port 115 formed at one end portion (right end portion in FIG. 2) of the casing 110 in the axial direction of the center axis O. The suction port 115 opens at a center portion of the impeller chamber S1 when viewed along the center axis O. The other end (end portion on a side opposite to the side connected to the suction port 115 of the casing 110) of the suction pipe 114 is connected to the evaporator 40 via a pipe. When the compressor 100 is operated, the low-pressure gas refrigerant of the refrigeration cycle is sucked into the impeller chamber S1 via the suction pipe 114. As described above, the impeller chamber S1 and the motor chamber S2 are in communication with each other, and thus, part of the refrigerant that has flowed into the impeller chamber S1 via the suction pipe 114 also flows into the motor chamber S2.

An end of the discharge pipe 116 is connected to a side portion of the casing 110. The discharge pipe 116 opens in a first space 118. The first space 118 is a space into which the refrigerant whose speed has been increased by the impeller 122 flows by passing through the diffuser portion 126. The other end (end portion on a side opposite to the side connected to the casing 110) of the discharge pipe 116 is connected to the condenser 20 via a pipe. When the compressor 100 is operated, the high-pressure gas refrigerant compressed by the compression mechanism 120 passes through the first space 118 and the discharge pipe 116 and is sent to the condenser 20.

(2-1-2) Compression Mechanism

As described above, the compression mechanism 120 includes, mainly, the impeller 122, the inlet guide vane 124, and the diffuser portion 126.

The impeller 122 includes a plurality of blades and has substantially a conical outer shape. The impeller 122 is disposed in the impeller chamber S1. The impeller 122 is attached to the shaft 130. When the shaft 130 rotates and the impeller 122 rotates, the gas refrigerant is taken into the impeller 122, and the speed of the gas refrigerant is increased by the impeller 122.

The inlet guide vane 124 is a mechanism that is provided at the suction port 115 of the compressor 100 to which the suction pipe 114 is connected and that adjusts the inflow amount of the refrigerant that flows to the impeller 122. The inlet guide vane 124 is disposed on the upstream side of the impeller 122 in a refrigerant suctioning direction of the compressor 100. The inlet guide vane 124 is attached to the casing 110.

The inlet guide vane 124 includes, mainly, a plurality of vane bodies 124a, a support portion 125a, an attachment portion 125b, and a drive portion 124b that drives the vane bodies 124a. The drive portion 124b is a stepping motor but is not limited thereto. The vane bodies 124a are wing-shaped members formed on a thin plate. The support portion 125a supports the vane bodies 124a. The support portion 125a is a member that is coupled to the vane bodies 124a and that serves as a shaft for turning the vane bodies 124a. The attachment portion 125b rotatably supports the support portion 125a. The attachment portion 125b is fixed to the casing 110 directly or indirectly. By the drive portion 124b turning the support portion 125a with respect to the attachment portion 125b via a power transmission mechanism (not illustrated), the vane bodies 124a turn, and the flow-path area of a flow path for the refrigerant that flows from the suction port 115 toward the impeller 122 in a view along the center axis O changes. As a result, the inflow amount of the refrigerant that flows to the impeller 122 changes.

The diffuser portion 126 is a refrigerant flow path that changes the refrigerant speed and increases the refrigerant pressure. The diffuser portion 126 is disposed between the impeller chamber S1 and the first space 118.

(2-1-3) Shaft

The shaft 130 is a drive shaft that transmits the driving force of the motor 140 to the impeller 122. The shaft 130 extends across the impeller chamber S1 and the motor chamber S2. In other words, the shaft 130 extends between the impeller chamber S1 and the motor chamber S2 beyond the wall portion 112. The shaft 130 is coupled at a center portion thereof in the axial direction (identical to the axial direction of the center axis O of the casing 110) of the shaft 130 to the rotor 144 of the motor 140. The impeller 122 is attached to one end portion of the shaft 130. The other end portion of the shaft 130 is provided with a disc portion 132.

The shaft 130 and the disc portion 132 are each made of a magnetic material since the shaft 130 is supported by the magnetic bearing 150 in the compressor 100.

(2-1-4) Motor

The motor 140 rotates the shaft 130. The motor 140 has, mainly, a stator 142 and the rotor 144. The stator 142 is formed in a cylindrical shape. The outer surface of the stator 142 is fixed to the inner surface of the casing 110. The rotor 144 is formed in a columnar shape. The rotor 144 is rotatably installed on the inner side of the stator 142 with a slight gap therebetween. A shaft hole into which the shaft 130 is inserted and fixed is formed at a center portion of the rotor 144.

(2-1-5) Magnetic Bearing

The magnetic bearing 150 supports the shaft 130 rotatably in a non-contact manner by magnetically floating the shaft 130.

The magnetic bearing 150 preferably includes a first radial magnetic bearing 152, a second radial magnetic bearing 154, and a thrust magnetic bearing 156. The first radial magnetic bearing 152 is disposed between the impeller 122 and the motor 140 in the axial direction of the shaft 130. In the axial direction of the shaft 130, the second radial magnetic bearing 154 is disposed between the motor 140 and the disc portion 132 provided at the end portion of the shaft 130. The thrust magnetic bearing 156 is disposed adjacent to the disc portion 132 provided at the end portion of the shaft 130.

Each of the first radial magnetic bearing 152, the second radial magnetic bearing 154, and the thrust magnetic bearing 156 includes a plurality of electromagnets (not illustrated) and supports the shaft 130 in a non-contact manner by a combined electromagnetic force of the plurality of electromagnets.

The plurality of electromagnets of the first radial magnetic bearing 152 are disposed adjacent to each other in the circumferential direction around the shaft 130. The plurality of electromagnets of the second radial magnetic bearing 154 are disposed adjacent to each other in the circumferential direction around the shaft 130. The plurality of electromagnets of the thrust magnetic bearing 156 are disposed in the axial direction of the shaft 130 so as to sandwich the disc portion 132 provided at the end portion of the shaft 130. The first radial magnetic bearing 152 and the second radial magnetic bearing 154 adjust the position of the shaft 130 in the radial direction. The thrust magnetic bearing 156 adjusts the position of the shaft 130 in the axial direction.

Positional adjustment of the shaft 130 will be described in more detail. The compressor 100 is provided with a plurality of sensors (not illustrated) for detecting the radial-direction position and the axial-direction position of the shaft 130 with respect to the magnetic bearings 152, 154, and 156. The sensors for detecting the radial-direction position and the axial-direction position of the shaft 130 with respect to the magnetic bearings 152, 154, and 156 are, for example, eddy-current-type displacement sensors. On the basis of results of detection by these sensors, the controller 60, which will be described later, controls the combined electromagnetic force that acts on the shaft 130 such that the shaft 130 is disposed at a predetermined position with respect to the magnetic bearings 152, 154, and 156. Specifically, the controller 60 controls a current that flows through each of the plurality of electromagnets of the first radial magnetic bearing 152, the second radial magnetic bearing 154, and the thrust magnetic bearing 156 to thereby control the combined electromagnetic force that acts on the shaft 130 and control the position of the shaft 130 with respect to the magnetic bearings 152, 154, and 156.

(2-1-6) Touchdown Bearing

The touchdown bearing 160 is a bearing that supports the shaft 130 while the magnetic bearing 150 is not energized, in other words, while the shaft 130 does not magnetically float.

The touchdown bearing 160 includes a first radial touchdown bearing 162 and a second radial touchdown bearing 164. The first radial touchdown bearing 162 and the second radial touchdown bearing 164 are each a rolling bearing. The rolling bearing may be a ball bearing in which a rolling element is a "ball" or may be a roller bearing in which a rolling element is a "roller". The inner ring, the outer ring, and the rolling element of each of the first radial touchdown bearing 162 and the second radial second radial magnetic bearing 154 and the disc portion 132 provided at the end portion of the shaft 130 in the axial direction of the shaft 130. The position of the second radial touchdown bearing 164 is, however, not limited this position and the second radial touchdown bearing 164 may be disposed between the motor 140 and the second radial magnetic bearing 154 in the axial direction of the shaft 130.

(2-2) Condenser

The condenser 20 is a water-cooled condenser in the present embodiment. However, the condenser 20 of the chiller apparatus 10 is not limited to the water-cooled condenser and may be an air-cooled condenser.

The condenser 20 is, for example, a shell-and-tube condenser; however, the type of heat exchanger is not limited. Cooling water cooled in, for example, a cooling tower (not illustrated) is supplied to the condenser 20, and heat is exchanged between the cooling water and the refrigerant.

(2-3) Expansion Valve

In the present embodiment, the expansion valve 30 is an electronic expansion valve. The expansion valve 30, however, may be a temperature automatic expansion valve that has a temperature sensitive cylinder. The chiller apparatus 10 may have, as an alternative to the expansion valve 30, a capillary tube as an expansion mechanism.

As illustrated in FIG. 1, the expansion valve 30 includes, mainly, a valve body 32 and a drive portion 34 that drives the valve body 32. The drive portion 34 is a stepping motor but is not limited thereto. On the basis of results of measurement by one or a plurality of sensors (not illustrated) that measure the temperature or the pressure of the refrigerant at a predetermined location in the refrigerant circuit 50, the later-described controller 60 controls the drive portion 34 to drive the valve body 32 and controls the opening degree of the expansion valve 30. When the drive portion 34 drives the valve body 32, the valve body 32 moves, while sliding on a side wall 32a that surrounds the valve body 32, to narrow the flow path for the refrigerant in the expansion valve 30 or to expand the flow path for the refrigerant in the expansion valve 30. For example, in FIG. 1, the valve body 32 moves upward and downward while sliding on the side wall 32a that surrounds the valve body 32. The controller 60 controls the drive portion 34 to drive the valve body 32 and controls the opening degree of the expansion valve 30, for example, to cause the degree of superheating calculated from the evaporation temperature of the refrigerant and the refrigerant temperature at the outlet of the evaporator 40, which are measured by the sensors, to become target values; however, the control method is not limited. touchdown bearing 164 are each made of, for example, high-carbon chromium bearing steel but are not limited thereto.

The first radial touchdown bearing 162 is disposed adjacent to the first radial magnetic bearing 152. The first radial touchdown bearing 162 is disposed between the impeller 122 and the first radial magnetic bearing 152 in the axial direction of the shaft 130. The position of the first radial touchdown bearing 162 is, however, not limited to this position and the first radial touchdown bearing 162 may be disposed between the first radial magnetic bearing 152 and the motor 140 in the axial direction of the shaft 130.

The second radial touchdown bearing 164 is disposed adjacent to the second radial magnetic bearing 154. The second radial touchdown bearing 164 is disposed between the (2-4) Evaporator The evaporator 40 is an evaporator for cooling liquid in the present embodiment. The evaporator 40 of the chiller apparatus 10 is not limited to the evaporator for cooling liquid and may be an evaporator for cooling air.

The evaporator 40 is, for example, a shell-and-tube evaporator; however, the type of heat exchanger is not limited. Liquid (heat medium) is supplied to the evaporator 40, heat is exchanged between the liquid and the refrigerant, and the liquid is cooled. The liquid cooled in the evaporator 40 is supplied to a use-side device (not illustrated) that uses the cooled liquid and used for air conditioning, cooling of facility devices, and the like.

(2-5) Controller

The controller 60 is a device that controls operation of portions of the chiller apparatus 10. The controller 60 is electrically connected to the compressor 100 and the expansion valve 30, for example, to be capable of controlling the operation of the compressor 100 and the expansion valve 30. The controller 60 is connected to sensors (not illustrated) for detecting the radial-direction position and the axial-direction position of the shaft 130 with respect to the magnetic bearings 152, 154, and 156 and sensors (not illustrated) for measuring the temperature or the pressure of the refrigerant at a predetermined location in the refrigerant circuit 50, so as to be capable of receiving signals from the sensors.

The controller 60 has, for example, a microprocessor or a CPU, an input/output interface, a RAM, a ROM, and a storage device in which a control program for controlling the operation of the chiller apparatus 10 is stored. The controller 60 may have an input device that receives an input from a user, a display device that displays various types of information for a user, and the like.

As described above, the controller 60 controls the combined electromagnetic force that acts on the shaft 130 on the basis of results of detection by the sensors for detecting the radial-direction position and the axial-direction position of the shaft 130 with respect to the magnetic bearings 152, 154, and 156 to dispose the shaft 130 at a predetermined position with respect to the magnetic bearings 152, 154, and 156.

The controller 60 also controls the capacity of the compressor 100 by controlling the rotational speed of the motor 140 of the compressor 100 on the basis of a result of measurement and the like by sensors (not illustrated) that measure the temperature or the pressure of the refrigerant at a predetermined location in the refrigerant circuit 50. The controller 60 also controls the amount of the refrigerant that flows into the impeller 122 by controlling the drive portion 124b of the inlet guide vane 124 on the basis of a measurement result and the like obtained by sensors (not illustrated) that measure the temperature or the pressure of the refrigerant at predetermined locations in the refrigerant circuit 50. The controller 60 also controls the drive portion 34 of the expansion valve 30 on the basis of a result of measurement and the like by sensors (not illustrated) that measure the temperature or the pressure of the refrigerant at predetermined portions of the refrigerant circuit 50, and adjusts the opening degree of the expansion valve 30. As a method of controlling the motor 140, the inlet guide vane 124, and the expansion valve 30 by the controller 60, various methods may be used.

(3) Grease

In the chiller apparatus 10, the following grease (referred to as grease G) is used for at least one of the devices installed in the refrigerant circuit 50. More specifically, the grease G is used, in the devices installed in the refrigerant circuit 50, at portions that require lubrication and in which the refrigerant may flow. In other words, the grease G is used, in the devices installed in the refrigerant circuit 50, at portions at each of which one member slides with respect to another member and in each of which the refrigerant may flow.

As a specific example, the grease G is used for at least one of the touchdown bearing 160 (the first radial touchdown bearing 162 and the second radial touchdown bearing 164), the drive portion 124b of the inlet guide vane 124, and the drive portion 34 of the expansion valve 30. In particular, in the chiller apparatus 10 of the present embodiment, the grease G is used as the lubricant for all of the touchdown bearing 160, the drive portion 124b of the inlet guide vane 124, and the drive portion 34 of the expansion valve 30. Specifically, the grease G is used, for the inlet guide vane 124, at a rolling bearing 124ba in the stepper motor as the drive portion 124b of the inlet guide vane 124. Specifically, the grease G is used, for the expansion valve 30, at a rolling bearing 34a in the stepper motor as the drive portion 34 of the expansion valve 30. The rolling bearings 34a and 124ba may be each a ball bearing in which the rolling element is a "ball" or may be a roller bearing in which the rolling element is a "roller". The inner ring, the outer ring, and the rolling element of each of the rolling bearings 34a and 124ba are each made of, for example, high-carbon chromium bearing steel but is not limited thereto.

The grease G may be used only for some of the touchdown bearing 160, the drive portion 124b of the inlet guide vane 124, and the drive portion 34 of the expansion valve 30. The grease G may be used at parts, other than those presented as examples, of the compressor 100 and/or the expansion valve 30 that require lubrication and in which the refrigerant may flow. The grease G may be used at portions of devices other than the compressor 100 and the expansion valve 30, that require lubrication and in each of which the refrigerant may flow.

The grease G is grease that contains, as a component, fluorine having high chemical stability. In particular, in order to suppress an influence that is generated on the grease by using the refrigerant that contains a chlorine atom and an olefin bond in a molecule in the refrigerant circuit 50, the grease that contains 10 wt % or more of fluorine is preferably used as the grease G.

The grease G contains, mainly, a base oil that serves as a base material, and a thickening agent dispersed in the base oil. Examples of the base oil used in the grease G include a mineral oil, a synthetic hydrocarbon oil, an ether oil, an ester oil, a polyglycol oil, a silicone oil, a fluorosilicone oil, and a fluorine oil. Examples of the thickening agent used in the grease G include calcium soap, lithium soap, sodium soap, calcium complex soap, aluminum complex soap, lithium complex soap, barium complex soap, bentonite, a urea compound, and a fluororesin (PTFE and the like).

When an oil that does not contain fluorine is used as the base oil in the grease G, a component containing fluorine is used as the thickening agent. When a component containing fluorine is not used as the thickening agent in the grease G, an oil containing fluorine is used as the base oil.

In Particular, it is preferable for the grease G to use a fluorine-containing oil (the fluorosilicone oil or the fluorine oil among the presented examples of the base oil) as the base oil, and a fluororesin as the thickening agent. As described above, the grease G preferably contains 10 wt % or more of fluorine.

(4) Features (4-1)

The grease G of the present embodiment is grease that is to be used in a device installed in the refrigerant circuit 50 in which a refrigerant containing a chlorine atom and an olefin bond in a molecule flows. The grease G contains fluorine as a component.

When a refrigerant containing a chlorine atom and an olefin bond in a molecule is used, using grease which is used in a conventional refrigeration cycle apparatus may cause inconvenience such as a decrease in the function of the grease as a lubricant.

In this embodiment, by using the grease G that contains fluorine and therefore has high chemical stability, it is possible to suppress the decrease in the function of the grease G as the lubricant, even when using a refrigerant that contains a chlorine atom and an olefin bond in a molecule and that has high oil solubility.

(4-2)

The refrigerant containing a chlorine atom and an olefin bond in a molecule is, for example, a refrigerant containing R1233zd(E) (trans-1-chloro-3,3,3-trifluoropropene). The refrigerant may be a refrigerant of a single component or may be a mixed refrigerant in which two or more types of refrigerants are mixed.

R1233zd(E) is a refrigerant that has a small global warming potential, a zero ozone depletion potential, a small environmental load, and that is non-flammable and safe with low toxicity. By using the grease G as the lubricant, it is possible to suppress the occurrence of the sliding failure of sliding portions of the devices in the refrigerant circuit 50 while using the above-described refrigerant that has a small environmental load and that is safe.

(4-3)

In the grease G of the present embodiment, an oil containing fluorine is preferably used as the base oil.

By using the grease G in which an oil containing fluorine and therefore having high chemical stability is used as the base oil, it is possible to suppress the decrease in the function of the grease G as the lubricant even when using a refrigerant containing a chlorine atom and an olefin bond in a molecule and having high oil solubility.

In the grease G of the present embodiment, a fluororesin is preferably used as the thickening agent.

By using the grease G in which a fluororesin having high chemical stability is used as the thickening agent, it is possible to suppress the decrease in the function of the grease G as the lubricant even when using a refrigerant that contains a chlorine atom and an olefin bond in a molecule and that has high oil solubility.

In particular, it is preferable for the grease G to use a fluorine-containing oil as the base oil and a fluororesin as the thickening agent.

(4-4)

The grease G of the present embodiment is preferably used as the lubricant for at least one of the following portions.

1. The first radial touchdown bearing 162 and the second radial touchdown bearing 164 as examples of the rolling bearing that pivotably supports the shaft 130 coupled to the motor 140 of the compressor 100 installed in the refrigerant circuit 50.
2. The drive portion 124b of the inlet guide vane 124 provided at the suction port 115 of the compressor 100 installed in the refrigerant circuit 50.
3. The drive portion 34 of the valve body 32 of the expansion valve 30 installed in the refrigerant circuit 50.

In the present embodiment, the grease G is used for all of the aforementioned three portions.

Specifically, the grease G is used, for the inlet guide vane 124, at the rolling bearing 124ba in the drive portion 124b of the inlet guide vane 124. Specifically, the grease G is used, for the expansion valve 30, at the rolling bearing 34a in the drive portion 34 of the expansion valve 30.

By using the grease G having high chemical stability, it is possible to suppress damage to the radial touchdown bearings 162 and 164, the inlet guide vane 124, the expansion valve 30, and the like even when using a refrigerant that contains a chlorine atom and an olefin bond in a molecule.

(4-5)

The chiller apparatus 10 according to an example of the refrigeration cycle apparatus of the present embodiment includes the refrigerant circuit 50 in which a refrigerant that contains a chlorine atom and an olefin bond in a molecule flows. At least the compressor 100 and the expansion valve 30 are installed in the refrigerant circuit 50. The compressor 100 includes the inlet guide vane 124, the motor 140, the shaft 130, the impeller 122, and the first radial touchdown bearing 162 and the second radial touchdown bearing 164 as examples of the rolling bearing. The inlet guide vane 124 is provided at the suction port 115 of the compressor 100. The shaft 130 is coupled to the motor 140. The impeller 122 is provided on the shaft 130. The first radial touchdown bearing 162 and the second radial touchdown bearing 164 pivotably support the shaft 130. The expansion valve 30 includes the valve body 32 and the drive portion 34 of the valve body 32. The grease G containing fluorine is used as the lubricant for at least one of the first radial touchdown bearing 162 and the second radial touchdown bearing 164 of the compressor 100, the drive portion 124b of the inlet guide vane 124 of the compressor 100, and the drive portion 34 of the expansion valve 30.

In the chiller apparatus 10 of the present embodiment, it is possible to suppress damage to the radial touchdown bearings 162 and 164, the inlet guide vane 124, the expansion valve 30, and the like, for each of which grease is used, even when using a refrigerant containing a chlorine atom and an olefin bond in a molecule.

(5) Modifications

Modifications of the aforementioned embodiment will be described below. The following modifications may be combined together, as appropriate, within a scope that causes no inconsistency.

(5-1) Modification A

In the aforementioned embodiment, the compressor 100 of the chiller apparatus 10 is a turbo compressor. As described above, the compressor 100 of the chiller apparatus 10, however, may be a screw compressor. When the compressor 100 is a screw compressor, the grease G may be used, for example, for a rolling bearing that pivotably supports a shaft to which a rotor is attached.

(5-2) Modification B

In the aforementioned embodiment, the compressor 100 has the magnetic bearing 150 and the touchdown bearing 160 as bearings that pivotably support the shaft 130; however, the compressor 100 is not limited thereto.

For example, the compressor 100 may have only a rolling bearing as the bearing of the shaft 130 without having the magnetic bearing 150. In other words, in the compressor 100, the shaft 130 may be constantly pivotably supported by a rolling bearing. In this case, the grease G is preferably used as the lubricant for the rolling bearing of the compressor 100.

(5-3) Modification C

In the aforementioned embodiment, the compressor 100 is a compressor of a type that does not use a refrigerating-machine oil; however, the compressor 100 is not limited thereto. The compressor 100 may be a compressor that uses a refrigerating-machine oil. In this case, the grease G is not necessarily used for the first radial touchdown bearing 162 and the second radial touchdown bearing 164.

ADDITIONAL NOTE

Although an embodiment and modifications of the present disclosure have been described above, it should be understood that various changes in the forms and the details thereof are possible without departing from the spirit and the scope of the present disclosure described in the claims.

INDUSTRIAL APPLICABILITY

The grease of the present disclosure can be widely used and useful in a device installed in a refrigerant circuit of a refrigeration cycle apparatus in which a refrigerant that contains a chlorine atom and an olefin bond in a molecule flows.

REFERENCE SIGNS LIST 10 chiller apparatus (refrigeration cycle apparatus)
30 expansion valve
32 valve body
34 drive portion
50 refrigerant circuit
100 compressor (turbo compressor)
115 suction port
122 impeller
124 inlet guide vane
124b drive portion
130 shaft
140 motor
162 first radial touchdown bearing (rolling bearing)
164 second radial touchdown bearing (rolling bearing)
G grease

CITATION LIST

Patent Literature

<PTL 1> Japanese Unexamined Patent Application Publication (Translation of PCT Application) No. 2011-520089

The invention claimed is:

1. A refrigeration cycle apparatus comprising a refrigerant circuit in which a refrigerant containing a chlorine atom and an olefin bond in a molecule flows,
wherein at least a turbo compressor and an expansion valve are installed in the refrigerant circuit,
wherein the turbo compressor includes an inlet guide vane provided at a suction port of the turbo compressor, a motor, a shaft coupled to the motor, an impeller provided on the shaft, and a rolling bearing that pivotably supports the shaft,
wherein the expansion valve includes a valve body and a drive portion of the valve body,
wherein grease containing fluorine is used as a lubricant for at least one of the rolling bearing of the turbo compressor, a drive portion of the inlet guide vane of the turbo compressor, and the drive portion of the expansion valve, and
wherein
an oil containing fluorine is used as a base oil, and
a fluororesin is used as a thickening agent.

2. The refrigeration cycle apparatus of claim 1, wherein the refrigerant contains R1233zd(E).

* * * * *